United States Patent [19]

Stanley

[11] 4,287,057
[45] Sep. 1, 1981

[54] PORTABLE SINK TOP WATER CONDITIONER

[76] Inventor: Bedford F. Stanley, 4901 E. Sunrise Dr., No. 1614, Tucson, Ariz. 85718

[21] Appl. No.: 183,320

[22] Filed: Sep. 2, 1980

[51] Int. Cl.³ ............................................. C02B 1/64
[52] U.S. Cl. .................................... 210/85; 210/266; 210/282; 210/290; 210/501
[58] Field of Search ...................... 210/85, 91, 94, 143, 210/266, 282, 284, 290, 501

[56] References Cited

U.S. PATENT DOCUMENTS

| | | |
|---|---|---|
| 2,605,901 | 8/1952 | Morrison et al. .................... 210/282 |
| 3,038,610 | 6/1962 | Hetherington .................. 210/282 X |
| 3,245,537 | 4/1966 | Burgess ....................... 210/85 |
| 3,893,333 | 7/1975 | Sunahara et al. ................ 210/143 X |

*Primary Examiner*—John Adee
*Attorney, Agent, or Firm*—Cahill, Sutton & Thomas

[57] ABSTRACT

The portable sink top water conditioner includes couplings for periodically recharging the water filtering and conditioning elements in response to an indicator signal generated as a result of deposition of a predetermined weight of material filtered from the water and retained by the conditioner. Filter elements for maintaining the bacteria count at an acceptable level may be incorporated.

10 Claims, 2 Drawing Figures

PORTABLE SINK TOP WATER CONDITIONER

The present invention relates to water conditioners and, more particularly, to rechargeable sink top water conditioners.

The water from many municipal water systems, although the water meets or exceeds conventional health standards, contains various minerals in solution. Commonly, such water is termed "hard" water. These minerals add a taste to the water which is unpleasant to many persons and taint the taste of coffee, tea, etc. Additionally, the minerals become deposited within pipes, shower heads, conduits, passageways and chambers of water handling devices, including coffee pots, automatic ice makers, etc., and constrict the flow therethrough.

For these reasons, a substantial industry has developed to supply dwellings with water conditioners for conditioning all of the water flowing into the dwelling. These water conditioners are expensive to purchase or lease. The required periodic replacement of the filtering and conditioning media is expensive whether done by the homeowner or by a service agency. Considering that most persons object primarily to hard water because of its taste and its effect upon consumed liquids, the expense of water conditioners per gallon of orally consumed water is extremely high.

For those persons who have a strong distaste for hard water, water conditioners of the type described above provide a solution but at a high price calculated on the basis of gallons orally consumed per monthly cost of water conditioner. However, these persons have no respite from the hard water they may have to consume at locations remote from their home, such as at motels, hotels, etc.

Most municipal water systems control the type of the bacteria and bacteria count in the water supplied to residences. However, not all bacteria are eliminated and some bacteria generally not thought to pose a health hazard may not be destroyed at all. This situation is generally deemed acceptable despite the fact that certain persons may be sensitive to and suffer a reaction from consumption of such bacteria or from the residual bacteria of the type sought to be eradicated. To reduce the bacteria count of all bacteria, it has been found useful to pass water to be orally consumed through a filtering element having a silver compound formed as part of the element. Various patents granted for this purpose include U.S. Pat. Nos. 2,459,896, 2,463,327, 3,268,444, 4,092,245 and 4,145,291.

It is therefore a primary object of the present invention to provide a water conditioner for potable water.

Another object of the present invention is to provide a tabletop water conditioner for drinking water.

Yet another object of the present invention is to provide a rechargeable water conditioner.

Still another object of the present invention is to provide a reverse flow rechargeable water conditioner.

A further object of the present invention is to provide a portable water conditioner for removing mineral deposits and reducing the bacteria count of water for oral consumption.

A yet further object of the present invention is to provide a means for sensing the need for recharging the water conditioning elements of a portable water conditioner.

A still further object of the present invention is to provide an inexpensive simple to use home water conditioner for all water needs in the kitchen.

These and other objects of the present invention will become apparent to those skilled in the art as the description thereof proceeds.

The present invention may be described with greater specificity and clarity with reference to the following drawings, in which.

Figure 1:
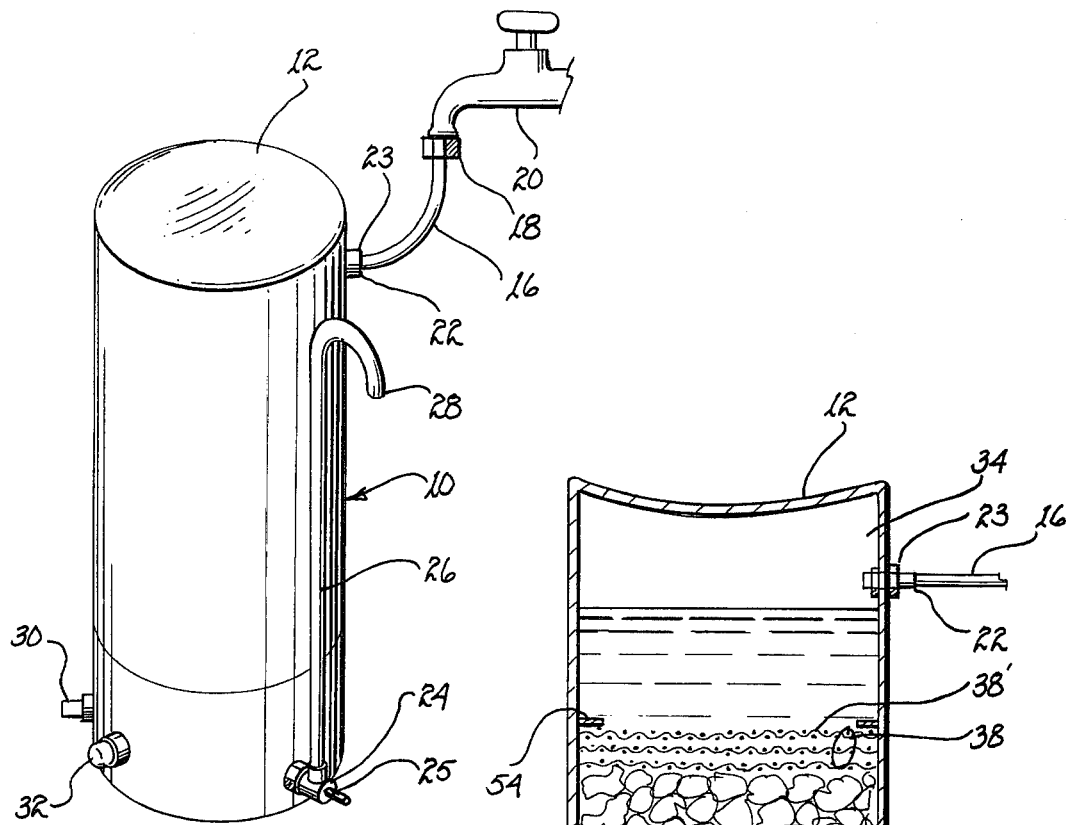
FIG. 1 is a perspective view of the water conditioner.

Referring to FIG. 1, there is shown a water conditioner 10 of a size sufficiently small to be placed upon a counter top in a kitchen or a bathroom of a dwelling. Nominally, the conditioner may be cylindrical, as illustrated, with a four inch diameter and a height of sixteen inches. It is to be understood that these dimensions may vary and the external configuration may be other than cylindrical.

As the water conditioner will have water under pressure, it is preferable that top 12 and the bottom surface 14 (see FIG. 2) by concavely dished, as illustrated, to better withstand the internal pressures. An inlet hose 16 is connectable by a conventional coupling 18 to a source of water, such as a conventional tap 20. For reasons which will be discussed further below, coupling 22 securing hose 16 to inlet 21 of conditioner 10 is preferably of the quick release type, various embodiments of which are avalable as off-the-shelf items.

Outflow of conditioned water is achieved through outlet 24 in response to a push button valve 25. The outlet supports an inverse J-shaped tube 26 having a downwardly directed discharge orifice 28. Thereby, the orifice is positioned to discharge filtered and conditioned water into a glass, coffee pot, etc., in response to actuation of valve 25.

Proximate the lower end of container 10, there is disposed an inlet 30 and valve 31 useful in conjunction with the recharging operation of the water conditioning elements within the container. Additionally, an indicator 32 may be located proximate the lower end of the container, which indicator generates a signal on accumulation of a predetermined quantity of material filtered from the water flowing through the conditioner.

Figure 2:
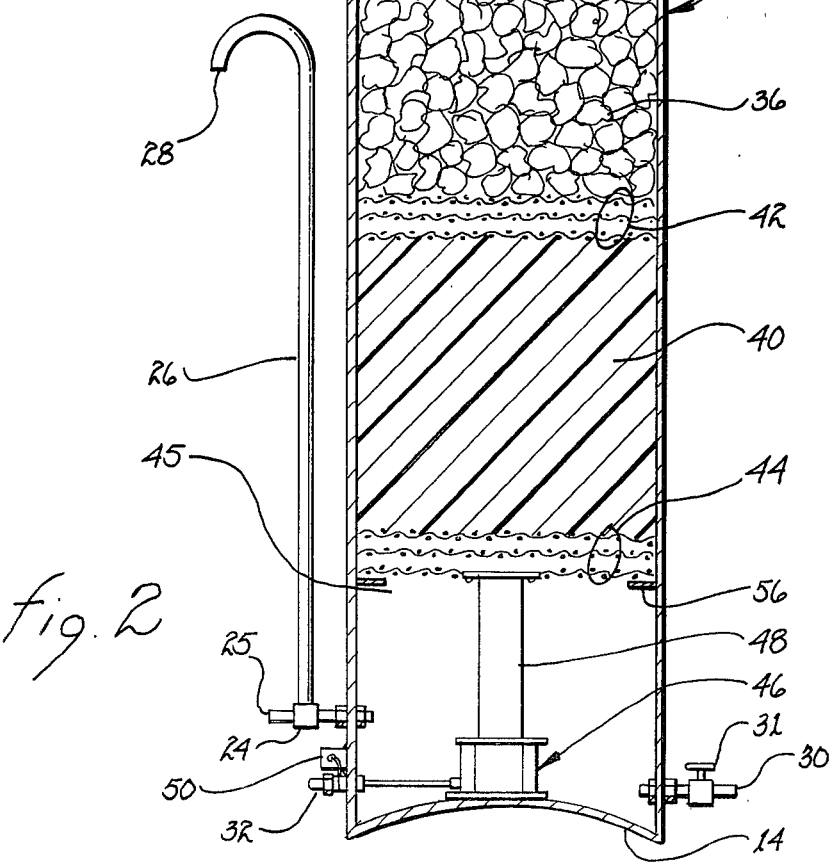
FIG. 2 is a representative cross-sectional view of the water conditioner.

The internal structure and operating characteristics of container 10 will be described with primary reference to FIG. 2. The water flowing into conditioner 10 through hose 16, coupling 22 and inlet 23 enters an upper chamber 34. The upper chamber is segregated from filtering and conditioning bed 36 by mechanical screens 38. Bed 36 may be, in example, a bed of activated carbon. Screens 38 may comprise three stainless steel screens, which screens are very resistant to corrosion and have a long useful life. The mesh of the screens may range from an eighty to one-hundred and sixty mesh although it has been found that a one-hundred and sixty mesh appears to be preferable.

To aid in control and reduction of the bacteria count of the water flowing through the conditioner, one or more of the screens may be silver plated, as indicated by numeral 38'. The activated carbon bed serves primarily to remove taste and odor from the water passing therethrough, as is well known.

A second filtering and conditioning bed 40 is segregated from bed 36 by screens 42, which screens may be duplicative of screens 38. Bed 40 may be comprised of four hundred grain resin to remove suspended solids, including various minerals which contribute to the hardness of the water. A further screen or set of screens 44 supports bed 40. These screens may also be duplicative of screens 38.

Inlet 23 and outlet 24 may include pressure regulating apparatus to control the internal pressure within container 10 and the flow rate/pressure at discharge orifice 28.

There exists a known or determinable ratio between the weight of elements removed from hard water and the filtering and conditioning capability of beds 36 and 40. That is, the filtering and conditioning capability is reduced to a nonacceptable level upon accumulation of a predeterminable weight of filtered elements. It is therefore feasible to determine the need for recharging conditioner 10 by measuring the weight of the elements filtered from the water flowing through the conditioner. In example, for a 150 gallon flow of water having a hardness of sixteen grains will produce approximately two pounds of filtered elements.

To provide an indication of this condition, weight responsive apparatus 46 located within chamber 45 defined by screens 44 and bottom 14 may be employed. This apparatus, located within chamber 45, may comprise a pressure sensitive switch or a weight sensitive switch. Actuation of the switch is effected by means of a pedestal 48 vertically repositionable in response to the accumulated weight of the elements filtered. If screens 36, 42 and 44 are not attached to the interior of container 10, the screens and beds 36 and 40 are free to move axially within the container. Thus, the mass sensed by apparatus 46 is the sum of the mass of the sets of screens, the filtering and conditioning beds and the filtered material.

To insure limited axial freedom of the screens and beds within container 10 for a distance sufficient to effect actuation of apparatus 46, annular rings 54, 56 may be employed to contain the screens and beds therebetween. Necessarily, the location of ring 56 along the axis of the container with respect to pedestal 48 must be such as to permit travel of the pedestal to actuate apparatus 46 before screens 44 become supported by ring 56.

By well known procedures, the initial threshold of actuation of apparatus 46 may be established at a value commensurate with that of the mass of the screens and beds internal to the conditioner. Thus, any increase in mass resulting from deposition of filtered out elements will be sensed by the apparatus. It is therefore a simple matter to set the final threshold of actuation of apparatus 46 commensurate with the predeterminable limited mass of elements which can be efficiently filtered by beds 36 and 40.

On actuation of apparatus 46 and assuming it to include an electrical switch, a simple circuit including a battery 50 and indicator 32 may be completed to energize the indicator. Thereby, a visual indicator provides a signal to the user to recharge the filtering and conditioning beds within container 10. It is of course to be understood that the indicator may be replaced by an audible alarm or any other type of signal generating device.

To illustrate the expected period of use of conditioner 10 by a family of four before the need for recharging of the conditioner and depending upon the degree of hardness of the water, the following table is provided:

| Hardness | Drops | Water Quantity |
| --- | --- | --- |
| 15 grains | 14 | 150 gallons |
| 8 grains | 30 | 300 gallons |
| 4 grains | 45 | 450 gallons |
| 2 grains | 60 | 600 gallons |

To recharge the conditioner, hose 16 is disconnected from tap 20 and inlet 23 by undoing coupling 22. Hose 16 or another hose is connected to inlet 30 and the conditioner is turned upside down. A further hose for discharging the flow from within container 10 is attached to inlet 23. A solution of salt or brine is introduced through inlet 30 into chamber 45 to wash through screens 44, bed 40, screens 42, bed 36 and screens 30 and be discharged through the hose attached to inlet 23. The resulting reverse flow of the salt solution or brine has the effect of removing the deposited elements and recharging beds 36 and 40. The duration of such reverse beds which is readily determinable from the mass of deposited elements sensed by apparatus 46.

After the requisite reverse flow through conditioner 10, hose 16 is disconnected from inlet 30 and reconnected to inlet 23 and tap 20 (see FIG. 1). The conditioner would now be ready for reuse as a water filtering and conditioning unit.

As will be evident by the above description, conditioner 10 is compact and is easily located upon a kitchen counter. Moreover, its size and portability render it convenient to be taken along on trips for use at temporary lodgings, such as hotels, motels, etc.

While the principles of the present invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:
1. A rechargeable portable water conditioner, said conditioner comprising in combination:
  (a) a container, said container including an inlet for receiving the water to be filtered and conditioned and an outlet for discharging the filtered and conditioned water;
  (b) a first filtering and conditioning media for removing odor and taste from the water;
  (c) a second filtering and conditioning media for removing material in suspension from the water;
  (d) a first screen for defining a first chamber intermediate said inlet and said first media;
  (e) a second screen for segregating said first media from said second media;
  (f) a third screen for defining a second chamber intermediate said second media and said outlet;
  (g) weight responsive apparatus disposed in said second chamber for sensing a predetermined mass added to said first, second and third screens and said first and second media through the deposition thereon of material filtered from the water;
  (h) means for providing an indication of the need to recharge said conditioner as a result of the added mass sensed by said apparatus; and
  (i) means for effecting recharge of said first and second media by reverse flow of a fluid through said conditioner.

2. The conditioner as set forth in claim 1 including means for accommodating translation of at least said third screen in response to the mass added by the material filtered from the water flowing through said conditioner.

3. The conditioner as set forth in claim 2 wherein said apparatus senses and is responsive to a change in position of said third screen.

4. The conditioner as set forth in claim 3 including means for accommodating limited movement within said conditioner of said first, second and third screens and said first and second media.

5. The conditioner as set forth in claim 4 wherein at least one of said first, second and third screens is silver plated.

6. The conditioner as set forth in claim 5 wherein said conditioner is cylindrical and includes means for standing said conditioner on either end depending on whether said conditioner is filtering the water or whether said first and second media are being recharged.

7. The conditioner as set forth in claim 5 wherein at least one of said first, second or third screens has at least an 80 mesh screen.

8. The conditioner as set forth in claim 5 wherein at least one of said first, second or third screens has at least an 160 mesh screen.

9. The conditioner as set forth in claim 1 including valve means disposed at said inlet and said outlet for maintaining the water under pressure within said conditioner.

10. The conditioner as set forth in claim 1 including a manually operated valve for regulating water flow through said outlet on command.

* * * * *